United States Patent Office 3,767,826
Patented Oct. 23, 1973

3,767,826
BATTER STARCH
James C. Fruin, Webster Groves, Mo., assignor to Anheuser-Busch, Incorporated, St. Louis, Mo.
Filed Oct. 7, 1970, Ser. No. 78,697
Int. Cl. A23b 3/14; A23l 1/00
U.S. Cl. 426—293
5 Claims

ABSTRACT OF THE DISCLOSURE

A batter starch and process of making same in which starch is mixed dry with an oxidizing agent, preferably calcium hypochlorite and preferably aged before being mixed with water to form a batter for coating frozen food products, particularly fish, to cause bread crumbs to adhere to the frozen food product. The crumb coated fish are fried and re-frozen to form a consumer product, or may be frozen raw for final preparation immediately prior to use.

BACKGROUND OF THE INVENTION

Adherence of the coating is a problem in the preparation of coated frozen food products, particularly fish fillets. Batter starches have been used for coating the fish to cause bread crumbs to stick to the frozen fish. It is well known that these products do not do a completely satisfactory job because the coatings tend to fall off or pull away from the coated food product.

Recently Pat. No. 3,482,984 proposed a partial solution to this problem by using an aqueous solution of sodium hypochlorite to oxidize a starch product used in making batter mix. This process has the disadvantage of requiring special equipment to handle the sodium hypochlorite solution as when dry, sodium hypochlorite is unstable and is a hazard in a plant.

I have discovered that it is possible to increase the adhereability of the bread crumbs by coating the fish with a batter formed from a dry mixed, slightly oxidized starch product as the base for the batter. The starch is dry mixed with an oxidizing agent, mixed with water for forming a batter, coated on the fish, and thereafter bread crumbs are applied to the batter coated fish. The crumb coated fish are fried, re-frozen and packaged as consumer items. The crumb coated fish can be frozen and then fried just prior to serving by the consumer. My process, being dry mixing, uses conventional starch processing equipment and is safe and easy to practice.

SUMMARY OF THE INVENTION

This invention comprises a batter mix for coating frozen fish or other food products so that bread crumbs will stick to the food product, said mix comprising water and a starch product dry mixed with an oxidizing agent, such as calcium hypochlorite, prior to being formed into a batter. The invention further comprises the starch product and process hereinafter described and claimed.

These and other objects and advantages will become apparent hereinafter.

DETAILED DESCRIPTION

My invention concerns the processing of a starch product to produce a base for a batter. A conventional starch, such as corn starch which has been wet milled, is dry mixed with an oxidizing agent, such as calcium hypochlorite. Other oxidizing agents may be used, and other types of starches or starch derivatives can be used. The batter also can be used for food products other than fish. Both the oxidizing agent and the starch are dry when mixed. The dry starch may contain up to 20% moisture and still be suitable for this invention.

The present invention involves a slight or mild oxidation treatment of the starch. This preferably is done in the starch plant and involves the dry mixing of the starch with a hypochlorite in the range of about 0.1 to about 5.0 parts hypochlorite to 1000 parts starch by weight. If substantially less hypochlorite is used, the oxidation effect is achieved much more slowly; and if substantially more hypochlorite is used, the oxidation is so strong that a good batter starch is not produced. While hypochlorites are preferred as the oxidizing agent, other oxidizing agents can be used.

After treatment with the hypochlorite in the dry form, the treated starch may be allowed to age. Accelerated aging can be used and longer time and higher temperatures also are effective. As previously mentioned, the treatment is a milk oxidation treatment and involves the use preferably of calcium hypochlorite. Other alkaline earth hypochlorites can be used, but calcium hypochlorite is the most practical and economical. Other oxidizing agents include chlorites, bromates, peroxides, etc. The food product can be frozen fish, unfrozen products, sea foods, red meats, and vegetables, e.g., onion rings.

The dry blending is important because it gives a faster and more certain reaction. It also is desirable that the starch be stored at room temperature or higher after treatment.

A reducing atmosphere causes undesirable action in a starch to be used as a batter starch. This is shown by tests in which the starch is placed in a desiccator, the air is removed by applying a vacuum, and $SO_2$ gas is added to replace the air. This produces a starch which does not have good batter starch characteristics.

The mild treatment caused by the calcium hypochlorite, the dry mixing of the oxidizing agent, and the level of calcium hypochlorite added are significant characteristics of this invention and are important in producing a starch batter which causes fast sticking power of bread crumbs to frozen fish.

The mildly oxidized starch is mixed with corn flour and/or other substances, such as wheat flour, milk powder, alginates, cellulose gums, salt, etc., to form a commercial product. This product then is mixed with water by the user to form a batter for coating frozen fish. The exact composition of the mix varies by proprietary product.

Figure 1:
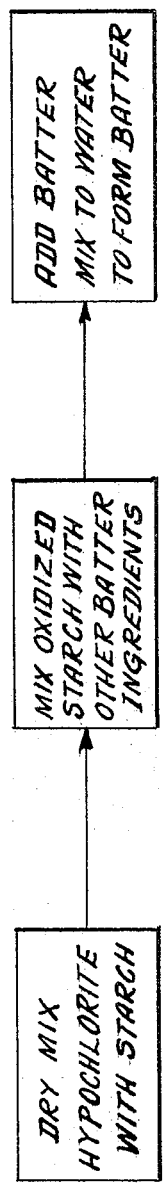
FIG. 1 is a flow diagram of a process for making the batter starch of the present invention.
Figure 2:
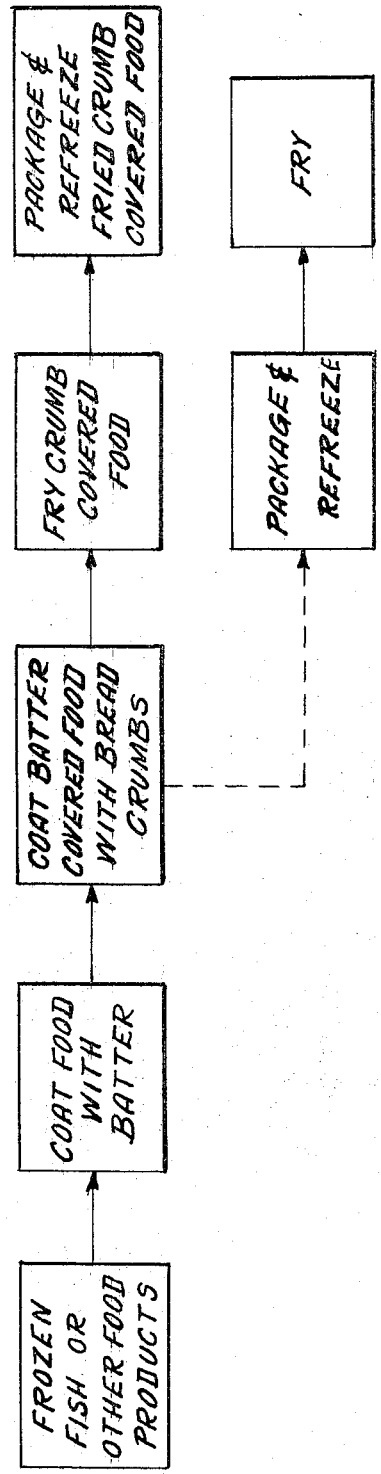
FIG. 2 is a flow diagram of processes for preparing a frozen cooked crumb covered food product utilizing the starch of the present invention.

FIG. 2 shows a flow diagram of how the user will coat a frozen food with this product. The frozen product is sprayed with the batter or can be submerged in the batter. Generally this is done on a moving conveyor. The coated product then is placed on a second conveyor where it is covered with bread crumbs. Other types of equipment can be used depending on the company and the food product, etc.

The crumb coated fish fillets are then packaged and re-frozen or are deep-fat fried, packaged, and re-frozen. The packaged product is sold to the ultimate consumer who prepares the product by heating in an oven or by frying.

EXAMPLE 5 pounds of granular dry corn starch having 10% moisture was mixed with 0.005 pounds of calcium hypochlorite. The mixing was done in a Twinshell mixer for 20 minutes. Thereafter, the hypochlorite treated starch is stored one week at room temperature. To make the batter, 150 grams of the treated aged starch is mixed with 150 grams white corn flour obtained by conventional milling techniques and 400 grams water is combined with this mixture of starch and flour to make the batter. The fish are a lot of frozen cod portions weighing 3⅓ ounces a piece. The fish are coated with the batter starch and then coated with bread crumbs. The crumb coated fish are deep-fat fried at 375° F. for 3½ minutes.

The fried fillets are then placed on edge and slit with a knife, exposing the interior surfaces in a manner similar to opening a book, so that the inner surface is exposed. Flesh is scraped from the batter-breading coating and the amount of fish flesh adhering to the coating is estimated. The table shows the percent of sides of fish which have the range of adhesion of bread crumbs set forth in said table. In preparing the table, each side of the fillet is examined and the percent of coverage is estimated by a worker skilled in working in this art.

The table below shows examples of results obtained in deep fat frying of fish, dipping pieces of frozen fish in batter and then coating with breading prior to deep fat frying. The table shows the degree of adhesion of batter to fish in ranges of 95 to 100%, 90 to 95%, 80 to 90%, and less than 80%.

TABLE

| Type of starch | Treatment | Age of starch when tested, days[1] | Adhesion, percent | | | |
|---|---|---|---|---|---|---|
| | | | 95-100 | 90-95 | 80-90 | 0-80 |
| Dent corn | None (control) | 3 | 25 | 37 | 13 | 25 |
| Do | 0.10% KBrO₃ | 3 | 50 | 50 | 0 | 0 |
| Do | None (control) | 12 | 0 | 0 | 13 | 87 |
| Do | 0.10% KBrO₃ | 12 | 0 | 10 | 20 | 70 |
| Do | 0.05% Ca(OCl)₂ | 12 | 8 | 50 | 25 | 17 |
| Do | None (control) | 4 | 0 | 0 | 0 | 100 |
| Do | 0.10% Ca(OCl)₂ | 4 | 42 | 25 | 25 | 8 |
| Do | 0.05% Ca(OCl)₂ | 4 | 25 | 50 | 17 | 8 |
| Do | None (control) | 9 | 0 | 17 | 33 | 50 |
| Do | 0.015% KMnO₄ | 9 | 25 | 33 | 25 | 17 |
| Do | 0.10% Na ClO₃ | 9 | 33 | 42 | 17 | 8 |
| Do | 0.20% H₂O₂ | 9 | 0 | 42 | 8 | 50 |
| Do | None (control) | 1 | 0 | 0 | 12 | 88 |
| Do | 0.05% NaClO₂ | 1 | 8 | 42 | 33 | 17 |
| Do | 0.25% NaClO₂ | 1 | 8 | 33 | 42 | 17 |
| Do | 0.01% NaClO₂ | 1 | 8 | 25 | 42 | 25 |
| Waxy maize | None (control) | 1 | 0 | 0 | 8 | 92 |
| Do | 0.10% (CaCl)₂ | 1 | 0 | 25 | 42 | 33 |
| Dent corn | None (control) | 2 | 0 | 0 | 0 | 100 |
| Do | 0.10% Ca(OCl)₂ | 2 | 42 | 42 | 16 | 0 |

[1] At room temperature.

Calcium hypochlorite is the preferred oxidizing agent because it gives the best and most rapid result when dry mixed.

In view of the foregoing, it is seen that the present invention provides a batter starch which achieves all of the objects and advantages sought therefor.

What I claim is:

1. A process of preparing a coated food product including the steps of:
   (a) dry mixing a dry solid oxidizing agent with dry starch in sufficiently small proportion of oxidizing agent to starch as to provide a mixture of solids when when aged and subsequently mixed with water will produce a batter having good adhesion to food products, there being between about 0.1 and about 5 parts dry oxidizing agent per 1000 parts dry starch by weight,
   (b) ageing the mixture in dry condition at a temperature and for a period of time sufficient to provide a mild oxidation treated starch,
   (c) forming a batter from said treated starch, and
   (d) applying said batter to a food product prior to coating said food product with a final coating of crumbs.

2. The process of claim 1 wherein the oxidizing agent is calcium hypochlorite

3. The process of claim 1 including the step of applying a coating of crumbs to the batter coated food product.

4. The process of claim 3 wherein the food product is frozen fish.

5. The process of claim 4 wherein the crumb coated frozen fish is fried and re-frozen.

References Cited

UNITED STATES PATENTS 3,208,851   9/1965   Antinori et al. _____ 99—1
3,482,984   12/1969  Marotta et al. _____ 99—1

OTHER REFERENCES

Whistler et al., Starch: Chemistry and Technology, 1965, pp. 475–7, vol. 1, Academic Press, New York, N.Y.

RAYMOND N. JONES, Primary Examiner

R. M. ELLIOTT, Assistant Examiner

U.S. Cl. X.R.

426—92, 253, 296, 302